(12) United States Patent
Renton et al.

(10) Patent No.: US 9,083,092 B2
(45) Date of Patent: Jul. 14, 2015

(54) ELECTRICAL CONNECTIONS FOR HIGH VOLTAGE ELECTRICAL DISTRIBUTION AND/OR RETICULATION

(75) Inventors: Andrew Charles Renton, Lower Hutt (NZ); Gregory John Barclay, Manukau (NZ); Murray Carl Tremain, Manukau (NZ)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 13/610,309

(22) Filed: Sep. 11, 2012

(65) Prior Publication Data

US 2013/0095705 A1  Apr. 18, 2013

Related U.S. Application Data

(63) Continuation of application No. PCT/NZ2011/000034, filed on Mar. 11, 2011.

(51) Int. Cl.
*H01R 11/01* (2006.01)
*H01R 4/28* (2006.01)
*H01R 4/40* (2006.01)
*H01R 4/42* (2006.01)
*H01R 11/15* (2006.01)
*H01R 13/53* (2006.01)
(Continued)

(52) U.S. Cl.
CPC .. *H01R 4/28* (2013.01); *H01R 4/40* (2013.01); *H01R 4/42* (2013.01); *H01R 11/15* (2013.01); *H01R 13/53* (2013.01); *H01R 43/26* (2013.01); *H02G 7/00* (2013.01); *Y10T 29/49174* (2015.01)

(58) Field of Classification Search
CPC .. H01R 11/285; H01R 11/281; H01R 11/283; H01R 11/282; H01R 11/286
USPC .......... 439/756, 762, 764, 767, 769
See application file for complete search history.

(56) References Cited

U.S. PATENT DOCUMENTS

| | | | | |
|---|---|---|---|---|
| 1,529,279 A | * | 3/1925 | St John | 439/756 |
| 1,809,774 A | | 6/1931 | Coates | |
| 1,841,371 A | * | 1/1932 | Hughes | 439/759 |

(Continued)

FOREIGN PATENT DOCUMENTS

| | | |
|---|---|---|
| CN | 201266688 | 7/2009 |
| CN | 201270283 | 7/2009 |

(Continued)

OTHER PUBLICATIONS

Int. Search Report cited in PCT Application No. PCT/NZ2011/000034 dated Jul. 5, 2011, 5 pgs.

(Continued)

*Primary Examiner* — Abdullah Riyami
*Assistant Examiner* — Vladimir Imas
(74) *Attorney, Agent, or Firm* — Cooper Legal Group, LLC

(57) ABSTRACT

Among other things, an apparatus and method for use with a high-voltage electrical connector are provided. The connector selectively connects a first electrical conductor to a second electrical conductor. The connector may comprise a body portion and a securing portion. The body portion and the securing portion may at least in part define an engaging aperture. A tensioning component may also be present to constrict and/or un-constrict the engaging aperture. The second electrical conductor may be received into or out of the engaging aperture in a direction lateral to the connector.

20 Claims, 9 Drawing Sheets

(51) Int. Cl.
*H02G 7/00* (2006.01)
*H01R 43/26* (2006.01)

(56) References Cited

U.S. PATENT DOCUMENTS

| | | | |
|---|---|---|---|
| 1,844,638 A * | 2/1932 | Clar | 439/769 |
| 1,847,021 A * | 2/1932 | Plachy | 439/756 |
| 1,920,548 A * | 8/1933 | Carlson | 439/762 |
| 2,228,344 A * | 1/1941 | Demeo | 439/756 |
| 2,305,503 A * | 12/1942 | Tenney | 439/764 |
| 2,425,764 A * | 8/1947 | Tenney | 439/767 |
| 2,506,010 A | 5/1950 | Birkenmaier | |
| 2,657,372 A | 10/1953 | Mowers et al. | |
| 2,774,054 A * | 12/1956 | Tenney | 439/767 |
| 2,925,579 A * | 2/1960 | Osborn | 439/388 |
| 3,478,306 A * | 11/1969 | McCray | 439/756 |
| 3,694,799 A * | 9/1972 | Shannon et al. | 439/726 |
| 5,498,178 A * | 3/1996 | Tabata | 439/762 |
| 5,558,544 A * | 9/1996 | Okada et al. | 439/762 |
| 5,707,257 A * | 1/1998 | Kotajima et al. | 439/762 |
| 5,711,688 A * | 1/1998 | Matsunaga et al. | 439/762 |
| 5,733,152 A * | 3/1998 | Freitag | 439/763 |
| 6,494,752 B1 * | 12/2002 | Liang | 439/764 |
| 6,773,310 B2 * | 8/2004 | Davis | 439/773 |
| 7,076,847 B2 * | 7/2006 | Schwope | 24/569 |
| 7,168,983 B2 * | 1/2007 | Graf et al. | 439/606 |
| 7,494,355 B2 * | 2/2009 | Hughes et al. | 439/181 |
| 7,695,291 B2 * | 4/2010 | Hughes et al. | 439/88 |
| 7,862,354 B2 * | 1/2011 | Hughes et al. | 439/181 |
| 7,878,849 B2 * | 2/2011 | Hughes et al. | 439/578 |
| 7,958,631 B2 * | 6/2011 | Hughes et al. | 29/857 |
| 8,109,776 B2 * | 2/2012 | Hughes et al. | 439/282 |

FOREIGN PATENT DOCUMENTS

| | | |
|---|---|---|
| CN | 201282208 | 7/2009 |
| DE | 3412323 A1 | 10/1985 |
| GB | 348434 A | 5/1931 |
| GB | 2362517 A | 11/2001 |

OTHER PUBLICATIONS

Int. Preliminary Report cited in PCT Application No. PCT/NZ2011/000034 dated Jun. 22, 2012, 19 pgs.
EP Communication cited in EP Application No. 11753678.9 dated Nov. 16, 2012, 2 pgs.
EP Communication cited in EP Application No. 11753678.9 dated Jun. 13, 2014, 1 pg.
Mexican Office Action cited in Mexican Application No. 12/10494 dated Apr. 28, 2014, 1 pg.
Mexican Office Action dated Dec. 15, 2014, 3 pages.
Supplemental Int. Search Report cited in EP Application No. 11753678.9 dated May 26, 2014, 9 pgs.
Reply EP Communication cited in EP Application No. 11753678.9 dated Feb. 26, 2015, 1 pg.

* cited by examiner

SECTION "A - A"

DETAIL "E"

ELECTRICAL CONNECTIONS FOR HIGH VOLTAGE ELECTRICAL DISTRIBUTION AND/OR RETICULATION

CROSS REFERENCE TO RELATED APPLICATIONS

This application claims the benefit of PCT application PCT/NZ2011/000034 filed on Mar. 11, 2011, which claims the benefit of NZ application 583,865 filed on Mar. 11, 2010. The PCT application and the NZ application are incorporated herein by reference.

BACKGROUND

This application relates to, among other things, connection systems for high voltage electrical distribution or reticulation. It finds particular, but not sole, application to the provision of a quick disconnect system to facilitate creating physical disconnect points for maintenance. One example application is for creating physical disconnect points in substations for maintenance.

Electrical substations are part of an electricity generation, transmission, and distribution system. Substations switch generators, equipment, and/or circuits or lines in and out of a system as well as transforming voltage, stepping it up or down depending on the type of substation.

An important part of substations is busbars. Electricity going through the substation is passed through these busbars to be distributed to the individual "bays" within the substation. Power lines from the different substation bays are then connected to the busbars to draw or supply power.

Often isolation of a substation bay is required to perform maintenance or fault repair, which requires the power line to the bay be disconnected from the busbar to cut the electricity to the bay (e.g., promoting a safe working environment for the technicians). In other words, the bay needs to be in a de-energised, or placed in a non-live state for maintenance or work.

Electricity entering the bay during manual operation, such as when technicians are performing maintenance or work, poses serious health and safety risks. Therefore regulations for substation operation often require creating a visible "physical break" in the power line connection to the bay from the busbars before work on the bay can begin. This means there needs to be a visible disconnection or break in the power line connecting the bay to the busbar to ensure no electricity can enter the bay from the busbars.

Currently, expensive technologies exist to provide visible and physical electrical disconnection between the busbar and the bays. These devices are commonly called "high voltage isolators" or "high voltage disconnectors" and are generally three phase gang operated, although they may be single phase.

In recent years, a new technology called Disconnecting Circuit Breakers (DCB) has been introduced by some equipment manufacturers. These devices provide on load electrical disconnection between the busbar and the bays and include an integral earth switch. DCB's do not include the facility to provide an electrical disconnection with a visible physical break. To achieve a visible physical break high voltage/high current connectors must be removed from the DCB's to affect the disconnection.

Should a bay need to be disconnected using these high voltage/high current connectors, a significant number of man hours are required to perform this task. Power companies wish to minimize the downtime (e.g., the period of time during which electricity is cut off) and cost for maintenance or repair works.

In the past, various connectors have been proposed for connecting earthing wires or taps to elongate conductors. These connectors typically comprise a hook portion which cooperates with a jaw portion to secure the connector to the conductor. The jaw portion is typically tightened against the conductor by a threaded member such as a bolt. Removal of the connector from the conductor requires the bolt to be undone, usually with an insulated tool known as a "hot stick". This procedure can be difficult, as the conductor is typically at a substantial height, and the head of the bolt may be in an unfavourable orientation for engagement with the hot stick, which may be difficult to maneuver due to its length and weight. In addition, the connector may be free to rotate relative to the conductor, particularly once the clamp has been partially loosened. This may make the disconnection operation time consuming and potentially hazardous.

In this specification, where reference is made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

According to one aspect, a high voltage electrical connector adapted to connect a first electrical conductor to a second electrical conductor is provided. The connector comprises a body portion, a securing portion, and a tensioning component. At least one of the body portion or the securing portion is adapted to connect to the first electrical conductor. The body portion and the securing portion, at least in part, define an engaging aperture in an interior of the connector. The tensioning component is adapted to at least constrict or unconstrict the engaging aperture. At least a portion of a surface defining the engaging aperture is adapted to engage a complimentary portion of the second electrical conductor.

According to another aspect, a high voltage electrical connection assembly adapted to selectively connect a first electrical conductor to a second electrical conductor is provided. The assembly comprises a high voltage electrical connector and an elongated bar portion adapted to interface with the connector. The connector comprises a body portion, a securing portion, and a tensioning component. At least one of the body portion or the securing portion is adapted to connect to the first electrical conductor. The body portion and the securing portion, at least in part, define an engaging aperture in an interior of the connector. The tensioning component is adapted to at least one of constrict or un-constrict the engaging aperture. The elongated bar has a first contoured surface and a second contoured surface adapted to interface with the engaging aperture. The elongated bar is increasing in thickness toward an edge of the elongated bar.

According to another aspect, a method for selectively connecting a first electrical conductor to a second electrical conductor is provided. The method comprises providing a high voltage electrical connector that comprises a body portion, a securing portion, and tensioning means. At least one of the body portion and the securing portion are adapted to connect to a first electrical conductor. The body portion and the securing portion, at least in part, define an engaging aperture.

Tensioning means is configured to constrict and un-constrict the engaging aperture. The method also comprises providing the second electrical conductor. The second electrical conductor comprises at least one elongated bar portion for the connector to engage. The elongated bar portion increasing in thickness toward at least one edge of the elongated bar portion. At least a portion of the at least one elongated bar portion adapted to engage a complimentary portion of at least a portion of a surface defining the engaging aperture. The method further comprises connecting the connector to the elongated bar portion to connect the first electrical conductor to the second electrical conductor.

According to another aspect, a kit of parts to provide a high voltage electrical connection adapted to selectively connect a first electrical conductor to a second electrical conductor is provided. The kit of parts comprises a high voltage electrical connector and the second electrical conductor. The connector comprises a body portion, a securing portion, and a tensioning component. At least one of the body portion and the securing portion is adapted to connect to the first electrical conductor. The body portion and the securing portion, at least in part, define an engaging aperture. The tensioning component is adapted to constrict and un-constrict the engaging aperture. The second electrical conductor comprises at least one elongated bar portion for the connector to engage. The at least one elongated bar portion has a first contoured surface and a second contoured surface to engage with the engaging aperture. The at least one elongated bar portion increases in thickness toward an edge of the elongated bar. The second electrical conductor also comprises a connecting portion to connect the elongated bar portion to least one of a busbar or an earthing point.

The example embodiments may be broadly said to comprise parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to". When interpreting statements in this specification which include that term, the features, prefaced by that term in each statement, all need to be present, but other features can also be present.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

Other aspects may become apparent from the following description which is given by way of example only and with reference to the accompanying drawings.

FIGURES

One or more embodiments are described below with reference to the accompanying figures.

FIG. 6a illustrates an enlarged view of a high voltage connector in an installation.

DESCRIPTION

Embodiments will now be described with reference to FIGS. 1 through 8a.

Figure 1:
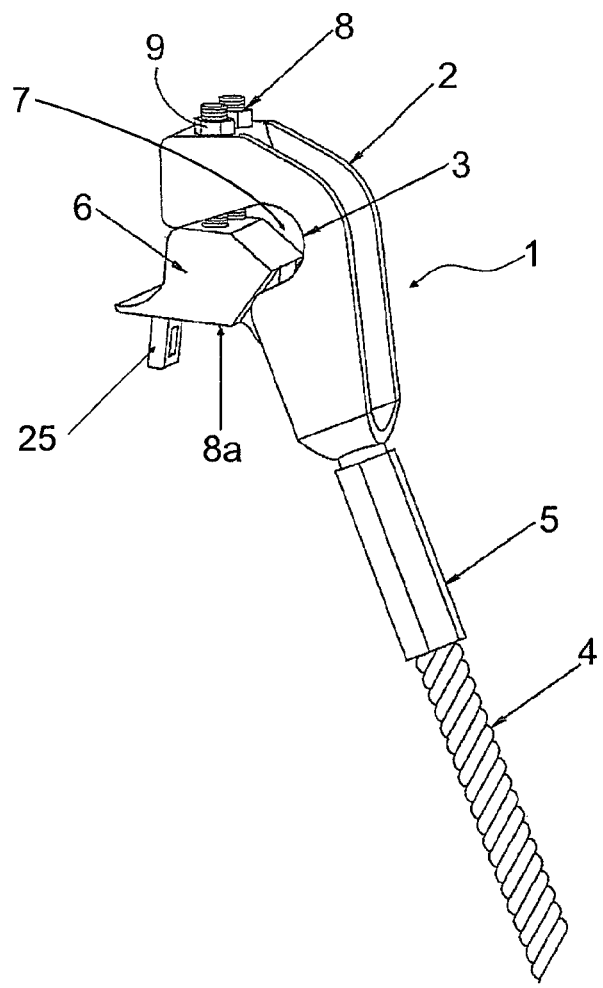
FIG. 1 illustrates a side perspective view of a high voltage electrical connector as provided for herein.
Figure 3:
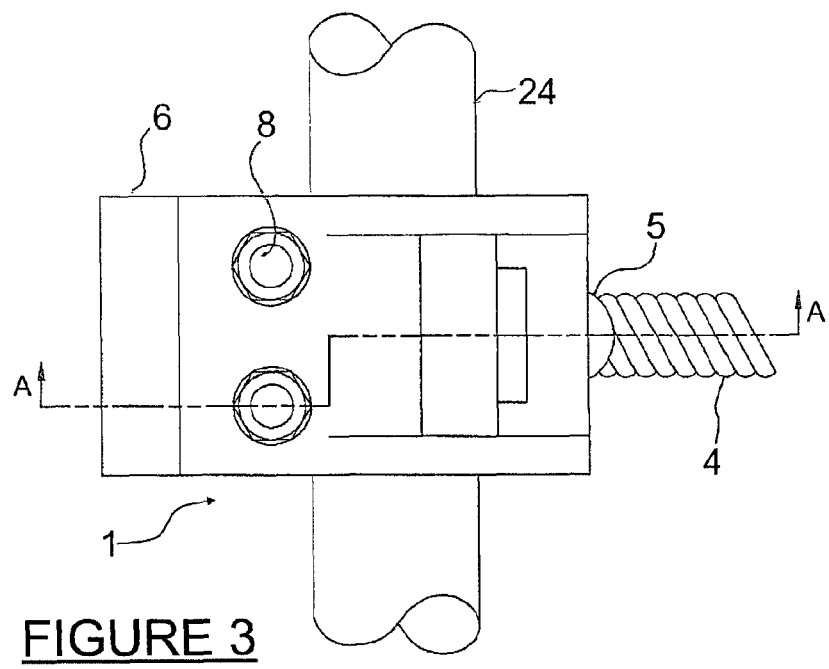
FIG. 3 illustrates a top view of a high voltage connector connected to a connector element.
Figure 3A:
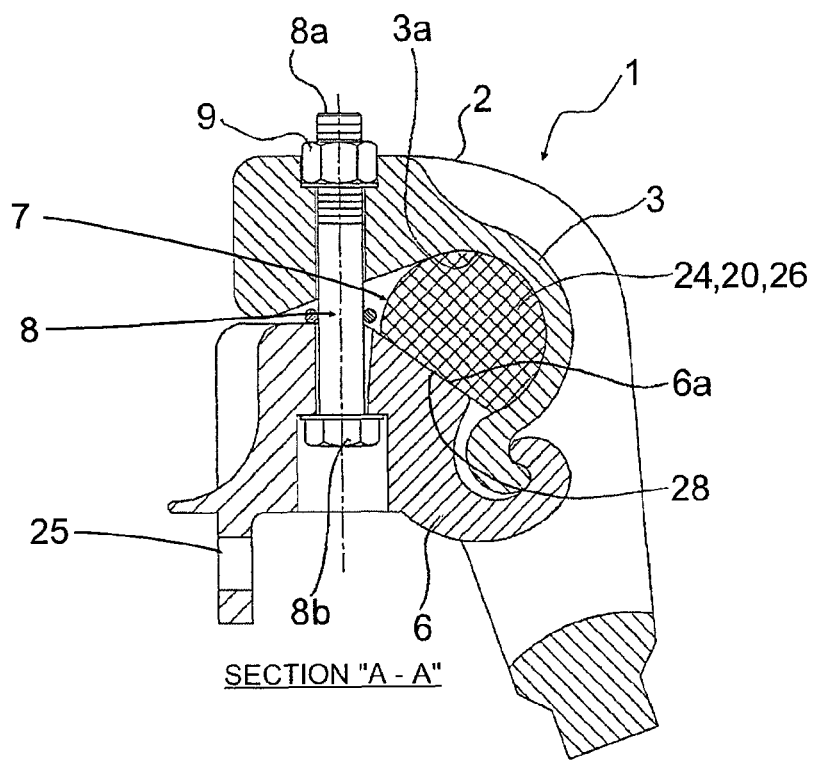
FIG. 3a illustrates a cross sectional view of a high voltage connector connected to a connector element.
Figure 4:
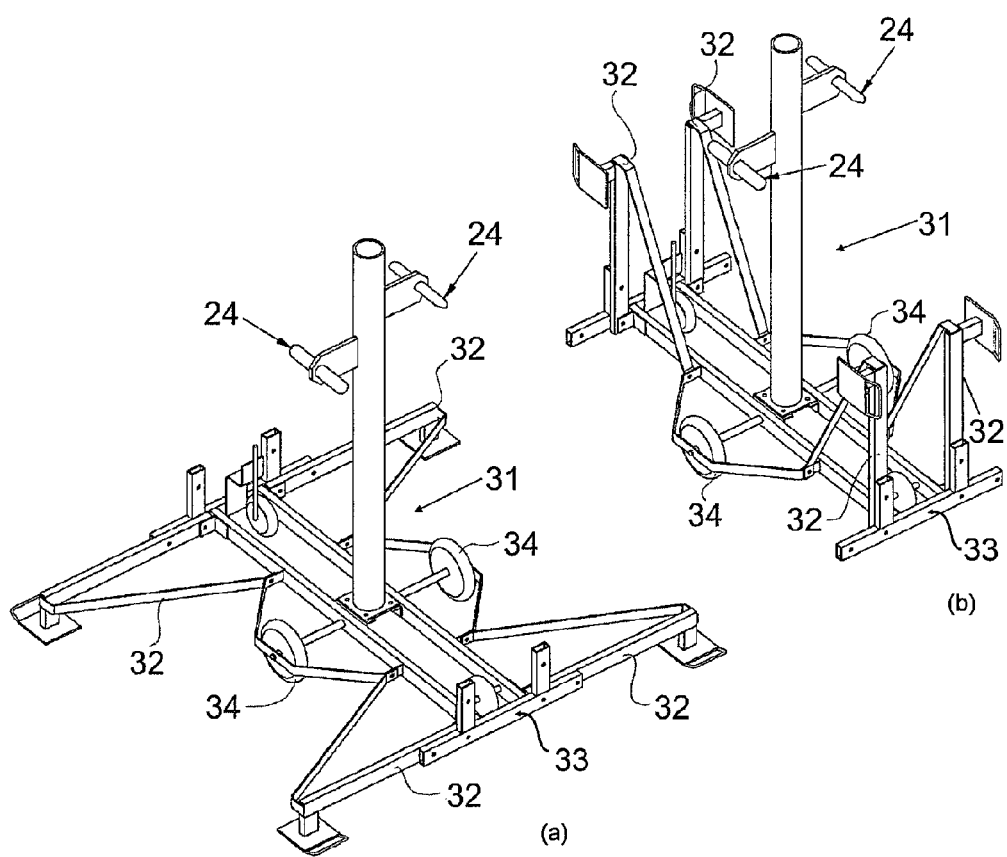
FIG. 4a illustrates a perspective view of an earthing trolley as provided for herein.
FIG. 4b illustrates a perspective view of an earthing trolley as provided for herein in a collapsed mobile configuration.

Referring first to FIGS. 1, 3, and 3a, a high voltage electrical connector 1 having a body 2 which includes a hooked portion 3 and a securing portion 6 is illustrated. The body 2 is at least made of an electrically conducting material such as metal or steel and is adapted for engagement with a first electrical conductor 4 such as power line 4a and thus may (optionally) include a crimpable sleeve 5 which is connected to or is a unitary part of the body 2 or securing portion 6. For example the crimpable sleeve 5 may be formed as part of the body 2, for example. In another embodiment, the crimpable sleeve 5 may be attached after or as part of the forming process via crimping, threading, bolting, welding, or other techniques which result in the crimpable sleeve 5 being secured to the body 2 or securing portion 6.

Figure 1A:
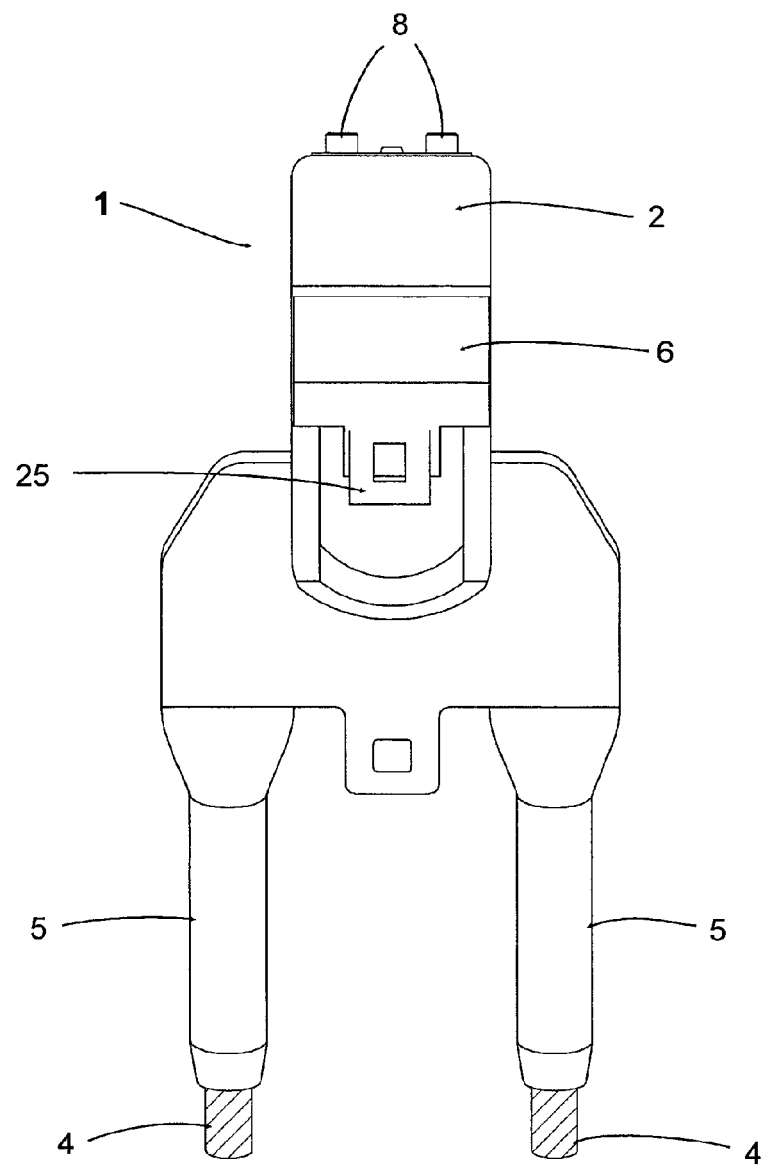
FIG. 1a illustrates a rear view of a high voltage electrical connector showing the use of two electrical connectors connected (permanently or otherwise) to the high voltage electrical connector.

Shown in FIG. 1a is a further embodiment of the connector 1 where there are two electrical conductors 4 engaged with the connector 1, such as power lines 4a. This may be required when the current or voltage load is such that additional first electrical conductor connections are desired (e.g., or required to support the load). In other embodiments, there may be three or even more first electrical conductors 4.

In another embodiment, the first electrical conductor 4 may be attached to the body 2 using other techniques and/or attachment mechanisms. The connector 1, body 2, and/or the first electrical conductor 4 (and preferably the securing portion 6) may have an electrically conductive connection (e.g., low resistance connection) in addition to or as part of a physical connection.

In one embodiment the first electrical conductor 4 or other electrical conductor equivalent is flexible, such as a power line 4a would be. However, in other embodiments, the first electrical conductor 4 may be rigid or semi-rigid.

Figure 2:
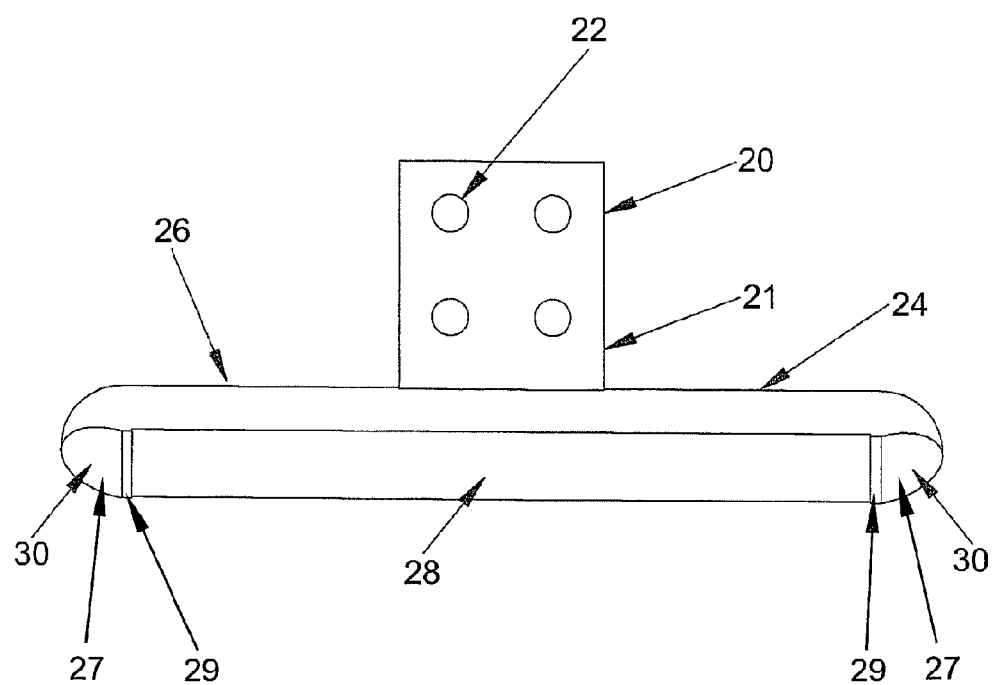
FIG. 2 illustrates a front elevation of a connector element.

Shown in FIGS. 1 and 3a, the body 2 and securing portion 6 and to some extent a tensioning means 8 form an engaging aperture 7 in the interior of the connector 1, to substantially enclose and engage a second electrical conductor 20 (shown in FIGS. 2 and 3a). In one embodiment, this engaging aperture 7 is defined by a hooked portion 3 and the securing portion 6 of the body 2. In other embodiments, a spring or biasing element may be present to aid in opening the engaging aperture 7.

In one embodiment, the connector 1 is connected to a flexible first electrical conductor 4 and the second electrical conductor 20 is rigidly connected to an element such as a live busbar. In this configuration the connector 1 is moved on and off and/or to and away from the second electrical conductor 20. In other embodiments, the opposite may occur, namely the connector 1 may be rigidly connected to an element such as a live bus bar and the second electrical conductor 20 may be attached to the (flexible) first electrical conductor 4. In such embodiments, the second electrical conductor 20 may be moved on and off and/or to and away from the connector 1.

The engaging aperture 7 may be fully closed (e.g., such that there is no gap in the periphery it encloses or forms) or may be partially closed (e.g., such that there is a partial gap in its periphery). It is understood that if a gap is present (for example if tensioning means 8 were not present as shown in FIG. 3a) in the periphery of engaging aperture 7, the gap may be of sufficient dimension that the second electrical conductor 20 cannot pass out of such gap under normal operating conditions. Instead the second electrical conductor 20 may merely pass in and out of the engaging aperture 7 by movement lateral to the connector 1 (e.g., when the engaging aperture 7 is un-constricted by tension means 8), that is, in and out of the page in FIG. 3A.

The tensioning means 8, when activated, can constrict the engaging aperture 7 (e.g., by relative movement of the securing portion 6 to the body 2) such that it connects to the bar portion 24 and relative rotation of the two is largely mitigated. In the opposite way the tensioning means 8, when loosened, can un-constrict the engaging aperture 7 such that the connector 1 is loose on the bar portion 24, and may be able to rotate at least a little.

The body 2 of the connector 1 includes a securing portion 6, which, in the embodiment shown, is a separate member that is pivotally dependent from the body 2. However, it may be appreciated that the securing portion 6 may be attached to the body 2 in other ways, such as via a slidable arrangement, for example. Furthermore, in other embodiments, the securing portion 6 may be disengageable from the body 2 or fixedly (e.g., yet movably) attached to, or unitary with the body 2, for example relaying on the elastic nature of the material of the body 2 to allow relative flexure between the securing portion 6 and the hooked portion 3. The engagement of the securing portion 6 to the body 2 may be of both a physical and electrically conductive one if the securing portion 6 is of an electrically conductive material.

In one embodiment the securing portion 6 is engaged with the body 2 such that even when the tensioning means 8 is un-tensioned, and thus the engaging aperture 7 is un-constricted about the bar portion 24 (e.g., to allow disengagement from the second electrical conductor 20 (described later on)), the securing portion 6 remains connected both physically and electrically to the body 2. In such an embodiment, the physical and/or electrical connection may be broken when the connector 1 is slide laterally off the bar portion 24 of the second electrical conductor 20, for example.

In one embodiment the connector 1 has a connecting portion 25 (e.g., coupled to the securing portion 6) for a hot stick connector. A hot stick is an insulated pole that allows an operator to engage and manipulate the connector 1 while it is live. The hot stick can be used to maneuver the connector 1 on and off the bar portion 24 (e.g., whether on a busbar 36 or earthing trolley 31). The hot stick can also be used to steady the connector 1 while the tensioning means 8 is activated (e.g., the bolt 8a is tightened) or deactivated (e.g., the bolt 8a is loosened) to thus constrict or un-constrict the engaging aperture 7 about the bar portion 24, for example. The hot stick may be a same tool used to first undo or release the tensioning means 8 and then used to move the connector 1 off the bar portion 24 (or vice versa) or there may be two separate tools, a first hot stick to undo the tensioning means 8 and a second hot stick to them move the connector 1. It may be appreciated that a bolt may be one example of tensioning means and/or a tensioning component and that other mechanisms configured to, at times, apply tension (e.g., thus constricting the engaging aperture 7) and to, at times, release tension (e.g., thus un-constricting the engaging aperture 7) are also contemplated for tensioning means and/or a tensioning component.

The connector 1 may be disconnected when energised using a hotstick or, when de-energised, hand tools may be used, for example.

The connecting portion 25, as shown, has a downwardly depending tongue with an aperture there through to allow the hot stick to engage therewith. Being on the lower portion of the securing portion 6, the hot stick can be used to break a physical contact between the connector 1 and the bar portion 24 that undoing the tensioning means does not, for example, due to corrosion, welding, or other fouling, for example. Other hot stick engagement methods known in the art may also be used.

Referring to FIG. 3a the hooked portion 3 has an internal contour 3a that, in one embodiment, forms is a concave engaging portion contoured so as to match and/or make a substantially continuous contact with a second electrical conductor or connector component 20, as will be described further below with reference to FIG. 2.

The securing portion 6 also has an internal contour 6a which is adapted to locate against the second electrical conductor 20 (as discussed with reference to FIG. 2). The internal contour 6a may comprises a keying means, such as a flat surface, for example, which is adapted to engage and, in part, clamp a complimentary portion (e.g., a second contoured surface 26 shown as a flat surface) of the second electrical conductor 20, as is described further below. In other embodiments the internal contour 6a could be of other forms, again, substantially complimentary to the second electrical conductor 20.

The remainder of the engaging portion 7 may be complimentary to the remainder of the contour of the bar portion 24, thus defining a first contoured surface 26 of the bar portion 24.

Shown in FIGS. 1 and 3a, the body 2 may comprise a tensioning means 8. In the embodiment illustrated the tensioning means 8 takes the form of a threaded connector such as a bolt 8a which co-operates with a nut 9. In one embodiment the nut 9 is captive to the body 2 to mitigate relative rotation. The nut 9 may be separate to the body 2 so that if it is damaged or worn it can be easily replaced. In other embodiments the threaded portion of the nut 9 is provided within the body 2.

It is to be understood that the second contoured surface 28, as a flat surface, largely mitigates free swinging or rotation of the connector 1 relative to the bar portion 24. In one embodiment, when the engaging aperture is constricted, the engagement of the connector 1 on the bar portion 24 is such that the two do not under normal operation move relative to each other, and thus a secure electrical and physical connection between the two occurs. When the engaging aperture 7 is loose (either through wear, failure or the tensioning means being loosened) then some relative rotation between the connector 1 and the bar portion 24 may occur. Such rotation may be exacerbated by the first electrical conductor 4 engaging the connector 1 at an angle to vertical, such that it exerts a torque on the connector 1 about the bar portion 24. This, in turn, may cause engagement of the keying means 6a (e.g., or its equivalent on the connector 1) with a complimentary portion of the second contoured surface 28 on the bar portion 24, for example. The result may be a level point that drives the first contoured surface 26 of the bar portion 24 deeper into a complimentary internal contour 3a of the body 2. This may result in a good physical and/or electrical contact between the connector 1 and the bar portion 24 even when the engaging aperture 7 is otherwise loose on the bar portion 24, for example.

The bolt 8a may comprise a head or other manipulatable portion 8b which is accessible from beneath the connector 1. Turning the head 8b of the bolt 8a may allow the securing portion 6 to be selectively moved relative to the body 2. This may allow the connector 1 to be moved into engagement with a conductor, such as a second electrical conductor 20 (as will be described further below), and then locked in place, or vice versa to allow release from the conductor. Significantly, the ability to manipulate the securement or otherwise of securing portion 6 from a location below the connector 1 may allow a user to connect or disconnect the connector 1. In one embodiment, the bolt 8a is provided on an opposite side of the securing member 6 to the connection with the body 2. This means that the securing portion 6 and bolt 8a substantially complete the engaging aperture 7, at least in normal use when engaging and disengaging a conductor such as the second electrical conductor 20.

In other embodiments, the engaging aperture 7 may be substantially defined by the hooked portion 3 and the securing portion 6, and the tensioning means 8 may not necessarily define the engaging aperture 7. For example, when the tensioning means 8 is on the opposite side of the engaging aperture 7 to that shown in FIG. 3a, the hooked portion 3 and securing portion 6 may overlap one other to substantially complete the engaging aperture 7, for example.

Referring now to FIG. 2, a second electrical conductor 20 is shown, which is adapted to co-operate with the high voltage electrical connector 1 of FIG. 1. In FIG. 2, the second electrical conductor 20 is adapted for location in a generally horizontal disposition, such as shown in vertical cross-section in FIG. 3a. However other orientations may also be used. The second electrical conductor 20 comprises an attachment portion 21 (e.g., in the form of a flange or other attachment form). In the embodiment shown in FIG. 2, the attachment portion 21 is attached, by bolts inserted through one or more apertures 22, to a conductor, such as a busbar 36 or an earthing apparatus (e.g., such as a busbars earthing trolley 31 described below with reference to FIG. 4).

The attachment portion 21 may be located relative to a bar portion 24, such that the bar portion 24 is disposed in a generally horizontal disposition and, in one embodiment, extends at least one of to the side of or away from the attachment portion 21. The bar portion 24 comprises two contoured surfaces. Shown in FIG. 3a, the first contoured surface 26 is generally provided on an upper part of the bar portion 24 and the second contoured surface 28 is generally located on a lower surface of the bar portion 24. The first contoured surface 26 is contoured to provide a substantially continuous contact engagement with an inner contour 3a of a mouth of hooked portion 3 of the connector 1 of FIG. 1. The second contoured surface 28 comprises a complimentary portion to the internal contour keying means 6a of the securing portion 6 and is adapted to facilitate the securing portion 6 making a secure engagement therewith. The engagement between the internal contour keying means 6a and the second contoured surface 28, as a complimentary portion, may substantially mitigate rotation of the connector 1 relative to the bar portion 24, for example.

Shown in FIG. 2, disposed towards the end 30 of respective bar portions 24 there is an angled entry surface 27, which (internal of the end 30) leads to a lip 29. The lip 29 is formed by an increase in thickness in the bar portion 24 towards the free end 30. There may be several purposes to this. By way of example, the angled entry surface 27 may act as a guide and may aid in the opening of the engaging aperture 7 when engaging the connector 1 onto the bar portion 24. If the securing portion 6, for example, is not sufficiently open, then, provided the tensioning means 8 is sufficiently tensioned off, the angled entry surface 27 may guide and open the engaging aperture 7, for example. This may be of benefit because engaging is often done at substantial overhead distance from an operator and multiple attempts can be dangerous (for example missing and hitting other live areas) and/or can be tiring to an operator, for example.

Another purpose for the lip 29 may be to retain the connector 1 once on the bar portion 24 and past the lip 29, for example. If the tensioning means 8 is not tensioned (either through failure or it has not been tightened yet) the lip 29 may provide a return which must be passed before the connector 1 can be removed.

The lip 29 may also act as a positive engagement so an operator can tell when the connector 1 is properly located on the bar portion 24, for example.

In one embodiment, when the second electrical connector is mounted, the second contoured surface 28 is not the lowest most surface of the connector 20. As shown in FIG. 3a, the second contoured surface 28 may be mounted at an angle relative to the horizontal. If, for any reason, there is not sufficient tension to engage the connector 1 with the bar portion 24 (e.g., the connector 1 has only just been placed on the bar portion 24, the tensioning means 8 has failed or is loose for any reason, etc.), the weight of the connector 1 and, for example, a power line 4a, may cause a partial rotation of the connector 1 relative to the bar portion 24. This, in turn, may cause a levering action of the internal contour 6a on the second contoured surface 28, which causes the first contoured surface to remain in good electrical and physical contact with the internal contour 3a. This action, coupled with the lip 29, may maintain good electrical contact and physical contact of the connector 1 with the second electrical conductor 20. Thus, while the internal contour 6a aims to mitigate relative rotation of the connector 1 when correctly tensioned on the bar portion 24 by the tensioning means 8, if there is incorrect or no tension (e.g., permitting relative rotation the angle of the internal contour 6a), the second contoured surface 28 and weight of the connector 1 may maintain a physical and electrical contact between the connector 1 and bar portion 24, for example.

It may be appreciated that other keying formations and complimentary portions are possible which will also create positive engagement between the body 2 and the bar portion (s) 24 to mitigate relative rotation thereof. Such other forms may reside on the securing portion 6, hooked portion 3, and/or bar portion 24 and may mitigate relative rotation between the connector 1 and second electrical connector 20, for example.

In one embodiment, the securing portion 6 and tensioning means 8 (e.g., a bolt 8*a*), in conjunction with the internal contour 3*a* of the hooked portion 3 and internal contour 6*a* of the securing portion 6, may completely enclose the engaging aperture 7. Therefore the connector 1 may be engaged with the bar portion 24 by sliding the connector axially in the longitudinal direction of the bar portion 24 onto the end 30 selected and over the lip 29. Thus, the connector 1 is not "hooked" over the second conductor 20 or its bar portion(s) 24, as is common with conventional connectors. In this way, the connector 1 is unlikely to fall off the conductor 4 if the connector 1 becomes loose and/or before the securing portion 6 is tightened against the bar portion 24, for example. That is, the substantial enclosure of the bar portion 24 by the connector 1 together with the lip 29 may provide a secure connection (e.g., even if the connector 1 becomes loose and/or even if high winds other adverse conditions are present). Therefore, the connector 1 may be less likely to fall off the second electrical conductor 20 (e.g., relatively to the likelihood with convention connectors). It may be appreciated that with the high currents (e.g., sometimes up to 60,000 Amps) and high voltages that these connectors may carry, security of the connection is very important. The falling off of a stray connector if live, or the falling onto other live components, is highly dangerous (to both equipment and personal) and can also take the bay or substation out (e.g., resulting in surrounding electrical users potentially losing power).

It will also be seen that the ends 30 of bar portion 24 are tapered or chamfered to facilitate the connector 1 being slid over either of the ends 30.

Even with the tensioning means 8 released so that the connector 1 can be slid over the bar 24, the keying means 6*a* may be in at least partial engagement with the complimentary second contoured surface 28 of the bar portion 24. This may cause connector 1 to be held in a relatively stable position, with the bolt head 8*b* facing downward in a convenient location for engagement by a hot stick. This may make tightening of the bolt 8*a* much easier than if the connector 1 were free to rotate about the bar portion 24, for example. Once the tensioning means 8 is fully tensioned the securing portion 6 may lock the connector 1 in position relative to the bar portion 24, for example.

Therefore, the apparatus may allow a quick and simple connection and disconnection of high voltage conductors from each other when a bay in a substation requires isolation, for example. This may be useful in high voltage electrical distribution or reticulation systems such as substations, for example. The connector 1, once disconnected, can then be connected to an earthing trolley 31 to earth the bay and provide a visible physical break in connection, for example.

When the connectors 1 of FIG. 1 and FIG. 2 are in the disconnected state, it may be desirable that the connector(s) are properly earthed. This also provides the visual physical break from the busbars 36, for example. To facilitate grounding the connector(s), an earthing trolley 31 in accordance with the apparatus shown in FIG. 4*a* and *b* may be provided.

As can be seen from FIG. 4*a* and *b*, the bar portion 24 of the connector of FIG. 2 is substantially replicated in the apparatus to allow the connector 1 of FIG. 1 to be easily attached thereto. The earthing trolley 31 is provided with deployable ground engaging portions as stabilizing legs 32 which are rotatably attached to the trolley body 33. In this way, the stabilizing legs 32 can be rotated from a substantially horizontal stabilizing, ground engaging, and/or earthing position (FIG. 4*a*) when the earthing trolley 31 is in use, to a substantially vertical position (FIG. 4*b*) that allows the earthing trolley 31 to be moved by a ground engaging portion (e.g., such as wheels 34). In one embodiment, a further earthing connection (not shown) connects the earthing trolley 31 to an earthing point.

Figure 5A:
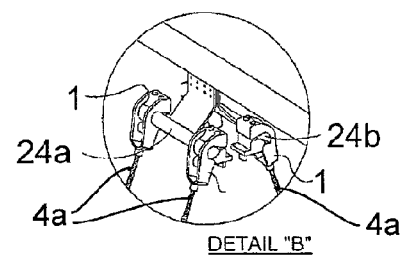
FIG. 5a illustrates an enlarged view of a high voltage connector in an installation.
Figure 5:
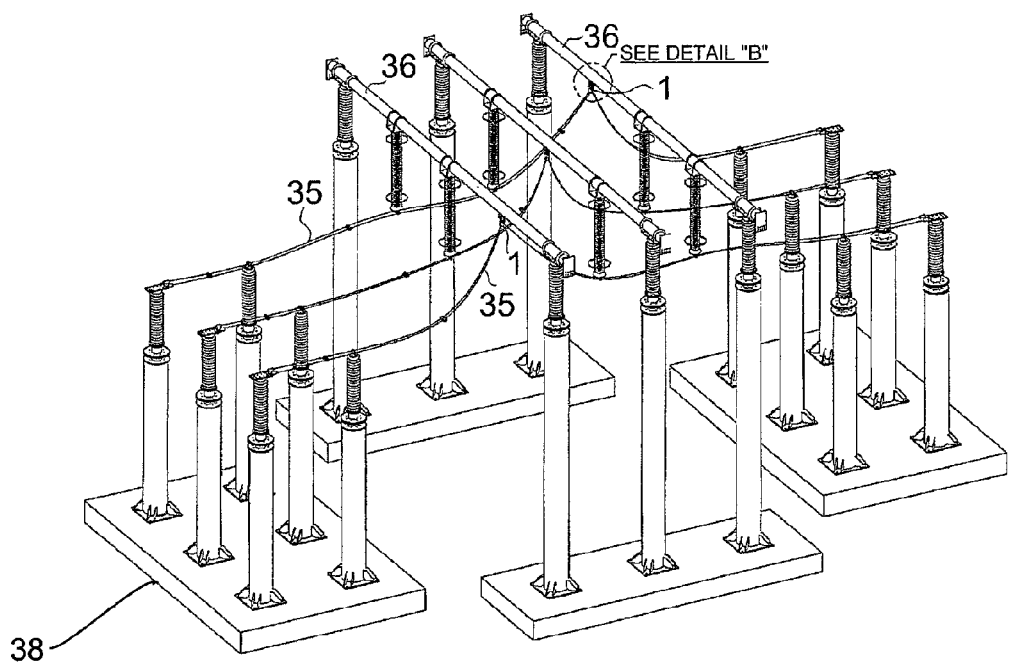
FIG. 5 illustrates a perspective view of an installation of a high voltage connector as provided for herein.

Referring next to FIGS. 5 and 5*a*, the connector system can be seen in use in a first configuration, connecting a bay 38 and droppers 35 via power lines 4*a* to connectors 1 to busbars 36. In the embodiment shown in FIGS. 5 and 5*a* the connectors 1 on a first bar portion 24*a* are facing in the opposite direction to the connectors 1 on an adjacent bar 24*b*. An earthing trolley 31 or trolleys (not shown) may be located at convenient positions to connect the disconnected connectors 1. This may provide a visual physical break and also earth the bay 38, for example.

Figure 6:
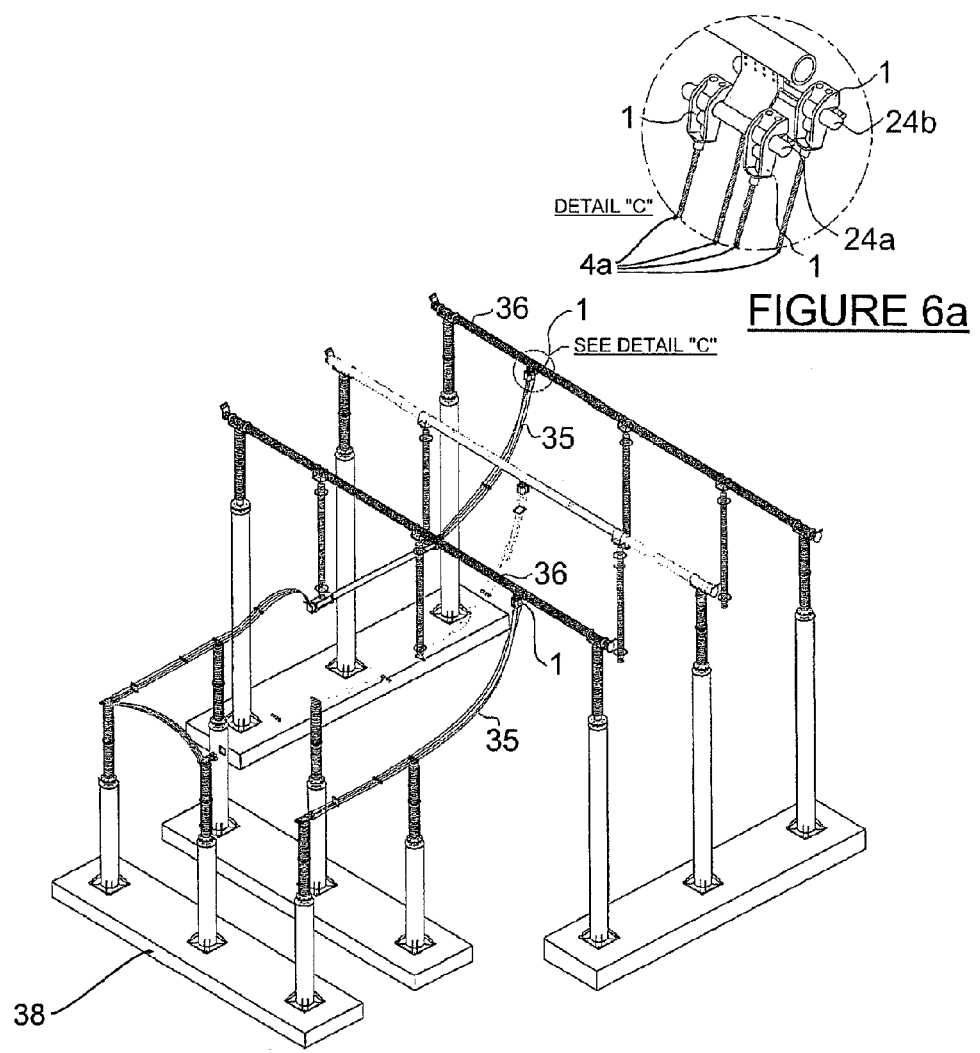
FIG. 6 illustrates a perspective view of an installation of a high voltage connector as provided for herein.

Referring next to FIGS. 6 and 6*a*, a second configuration is shown with connectors 1 on first bar portion 24*a* and second bar portion 24*b* facing in the same direction. Again an earthing trolley 31 or trolleys (not shown) may be located at convenient positions to connect the disconnected connectors 1 to. This may provide a visual physical break and also earth the bay 38, for example.

Figures 7, 7A:
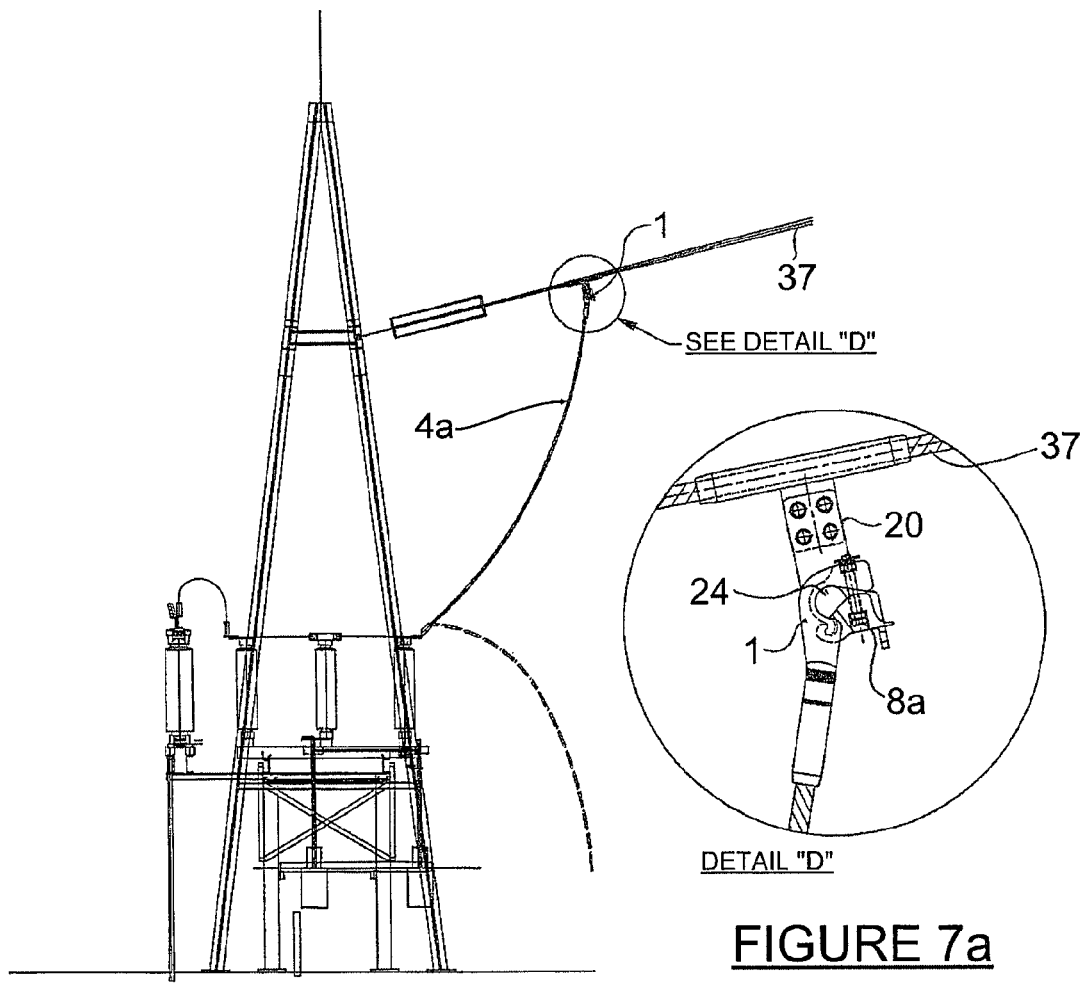
FIG. 7 illustrates a side elevation of an installation of a high voltage connector.
FIG. 7a illustrates an enlarged view of a high voltage connector in an installation.

Referring next to FIGS. 7 and 7*a*, the connector 1 of the present invention is shown in use with the second electrical conductor 20 connected to an overhead line 37. In other embodiments, as described above, the second electrical conductor 20 may be connected to a rigid busbar 36. As can be seen particularly in FIG. 7*a*, the connector 1 is being held in a position that provides access to the tensioning means 8 (e.g., a bolt head 8*b*) from the ground. Once un-tensioned by a hot stick, the power line 4*a* and/or connector 1 can be moved by the same or different hot stick to another connection, for example. For example, an earthing trolley 31 or trolleys (not shown) located at convenient positions on the ground may be utilized for connecting the connectors 1 when disconnected. This may provide a visual physical break and also earth the bay 38, for example.

Figure 8A:
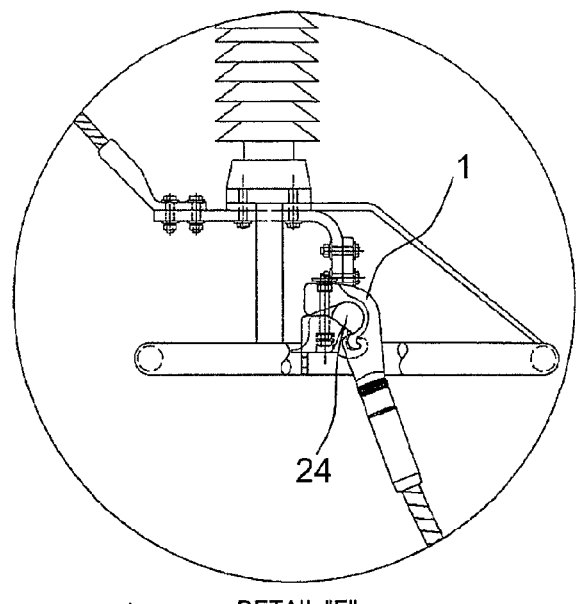
FIG. 8a illustrates an enlarged view of a high voltage connector in an installation.
Figure 8:
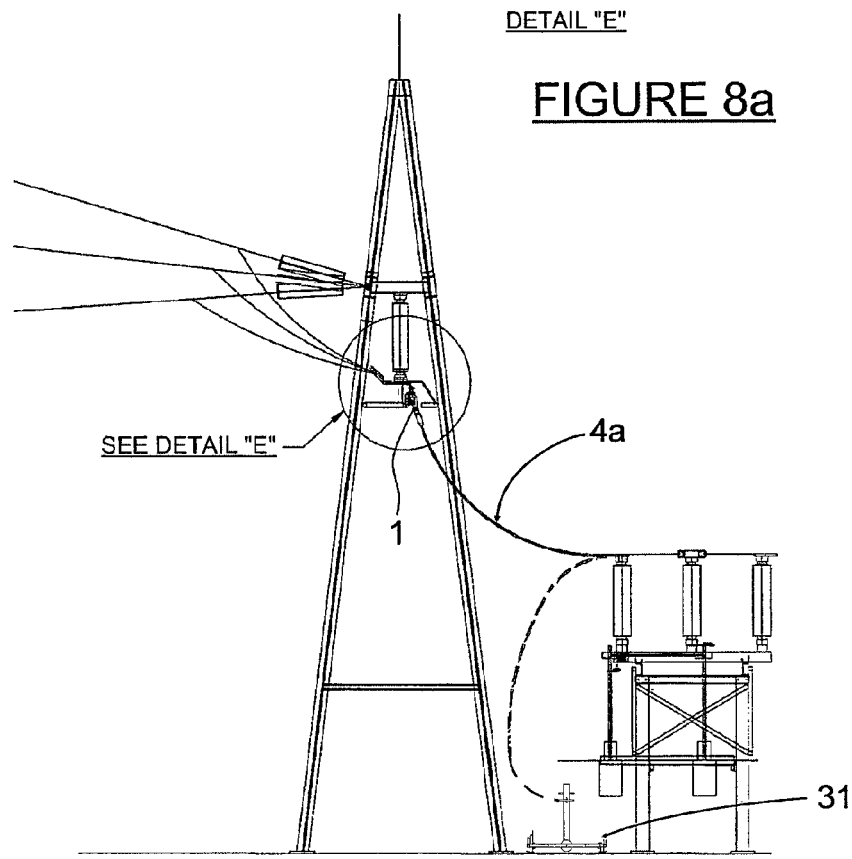
FIG. 8 illustrates a side elevation of an installation of a high voltage connector.

Referring next to FIGS. 8 and 8*a*, the connector 1 is shown in a configuration which is suitable for use with a disconnecting circuit breaker (DCB). Again, once un-tensioned by a hot stick, the power line 4*a* and/or connector 1 can be moved by the same or different hot stick to another connection, for example. By way of example, an earthing trolley 31 or trolleys (not shown) located at convenient positions on the ground may be utilized for connecting the connectors 1 when disconnected. This may provide a visual physical break and also earth the bay 38, for example.

In one embodiment, one or more components described herein can be supplied as a kit of parts, which may be assembled at a substation or in an assembly plane.

The present application has been described by way of example and with reference to possible embodiments thereof. It is to be understood that modifications or improvements may be made thereto without departing from the scope or spirit of the invention.

What is claimed is:

1. A high voltage electrical connector comprising:
   a body portion;
   a securing portion; and
   a tensioning component,
      at least one of the body portion or the securing portion adapted to connect to a first electrical conductor,
      the body portion and the securing portion at least in part forming a surface defining an engaging aperture in an interior of the high voltage electrical connector, the surface comprising a planar portion and a non-planar portion, the planar portion adapted to engage a complimentary portion of a second electrical conductor to substantially mitigate rotation of the high voltage electrical connector relative to the second electrical conductor when the engaging aperture is at least partially un-constricted, and the tensioning component adapted to at least constrict or un-constrict the engaging aperture.

2. The high voltage electrical connector of claim 1, wherein the surface is further formed by the tensioning component.

3. The high voltage electrical connector of claim 1, wherein the engaging aperture receives the second electrical conductor in a direction lateral to a longest extent of the body portion.

4. The high voltage electrical connector of claim 1, wherein the engaging aperture is, at least when constricted, substantially complimentary in shape to a cross-sectional shape of the second electrical conductor.

5. The high voltage electrical connector of claim 1, wherein at least some of the surface maintains an electrical connection and a physical connection between the high voltage electrical connector and the second electrical conductor during at least a partial rotation of the second electrical conductor relative to the high voltage electrical connector.

6. The high voltage electrical connector of claim 1, wherein the planar portion is formed by the securing portion.

7. The high voltage electrical connector of claim 1, wherein the non-planar portion is formed by the body portion.

8. The high voltage electrical connector of claim 1, wherein the tensioning component comprises a threaded member extending between the body portion and the securing portion.

9. The high voltage electrical connector of claim 1, wherein the securing portion is pivotally connected to the body portion.

10. The high voltage electrical connector of claim 1, wherein the body portion is substantially hook shaped and the securing portion is configured to substantially close off an opening in the hook shape to form the engaging aperture.

11. The high voltage electrical connector of claim 1, wherein the tensioning component is adapted to constrict the engaging aperture to lock the high voltage electrical connector onto the second electrical conductor.

12. A high voltage electrical connection assembly, the assembly comprising:
a high voltage electrical connector comprising:
a body portion;
a securing portion; and
a tensioning component,
at least one of the body portion or the securing portion adapted to connect to a first electrical conductor,
the body portion and the securing portion at least in part defining an engaging aperture in an interior of the high voltage electrical connector, and
the tensioning component adapted to at least one of constrict or un-constrict the engaging aperture, and
an elongated bar portion adapted to interface with the high voltage electrical connector,
the elongated bar portion having a first contoured surface and a second contoured surface adapted to interface with the engaging aperture, and
the elongated bar portion increasing in thickness toward an edge of the elongated bar portion.

13. The connection of claim 12, wherein the first contoured surface is non-planar and the second contoured surface is planar.

14. The connection of claim 12, wherein the second contoured surface is adapted to substantially mitigate rotation of the high voltage electrical connector relative to the elongated bar portion.

15. The connection of claim 12, wherein the tensioning component is adapted to constrict the engaging aperture to mitigate rotation of the high voltage electrical connector relative to the elongated bar portion.

16. A method for selectively connecting a first electrical conductor to a second electrical conductor, comprising:
providing a high voltage electrical connector comprising:
a body portion and a securing portion, at least one of the body portion or the securing portion adapted to connect to the first electrical conductor, the body portion and the securing portion at least in part defining an engaging aperture, and
a tensioning portion configured to constrict and un-constrict the engaging aperture;
providing the second electrical conductor comprising:
at least one elongated bar portion for the high voltage electrical connector to engage, the elongated bar portion increasing in thickness toward at least one edge of the elongated bar portion; and
connecting the high voltage electrical connector to the elongated bar portion to connect the first electrical conductor to the second electrical conductor.

17. The method of claim 16, the second electrical conductor operably coupled to a busbar for transmission of electricity.

18. The method of claim 16, the second electrical conductor present on an earthing trolley.

19. A kit of parts, comprising:
a high voltage electrical connector comprising:
a body portion;
a securing portion; and
a tensioning component,
at least one of the body portion or the securing portion adapted to connect to a first electrical conductor,
the body portion and the securing portion at least in part defining an engaging aperture, and
the tensioning component adapted to constrict and un-constrict the engaging aperture; and
a second electrical conductor comprising:
at least one elongated bar portion for the high voltage electrical connector to engage, the at least one elongated bar portion having a planar surface and a non-planar surface to engage with the engaging aperture; and
a connecting portion to connect the elongated bar portion to least one of a busbar or an earthing point.

20. The high voltage electrical connector of claim 19, wherein the engaging aperture is defined by a surface formed, at least in part, by the body portion and the securing portion, wherein the surface comprises a planar portion and a non-planar portion.

* * * * *